United States Patent [19]

Yoon et al.

[11] Patent Number: 4,600,568
[45] Date of Patent: * Jul. 15, 1986

[54] FLUE GAS DESULFURIZATION PROCESS

[75] Inventors: Heeyoung Yoon, McMurray; Robert M. Statnick, Pittsburgh, both of Pa.

[73] Assignee: Conoco Inc., Wilmington, Del.

[*] Notice: The portion of the term of this patent subsequent to Jul. 15, 2003 has been disclaimed.

[21] Appl. No.: 714,742

[22] Filed: Mar. 22, 1985

[51] Int. Cl.$^4$ .................. C01B 17/00; B01J 8/00
[52] U.S. Cl. .................. 423/242; 423/243; 423/244
[58] Field of Search .......... 423/242 A, 242 R, 243, 423/244 A, 244 R; 110/343, 345

[56] References Cited

U.S. PATENT DOCUMENTS

| | | | |
|---|---|---|---|
| 3,632,306 | 1/1972 | Villiers-Fisher et al. | 423/242 |
| 3,798,309 | 3/1974 | Knowles et al. | 423/243 |
| 4,080,428 | 3/1978 | Holter et al. | 423/242 |
| 4,454,102 | 6/1984 | Lindau et al. | 423/244 |
| 4,533,532 | 8/1985 | Gebhard et al. | 423/244 |

Primary Examiner—Gregory A. Heller
Attorney, Agent, or Firm—William A. Mikesell; Cortlan R. Schupbach

[57] ABSTRACT

Flue gas is desulfurized by mixing into it at a temperature between about 120° and about 230° C. a finely divided sorbent such as calcium hydroxide and, immediately downstream of the mixing point, spraying the gaseous suspension with an aqueous solution of solubilizing agent such as a deliquescent compound or a strongly ionizing inorganic salt. In one embodiment, make-up sorbent is derived from injection of limestone or dolomite into the combustion zone, and in another embodiment a portion of the solids separated from the flue gas is reactivated for reuse as sorbent.

4 Claims, 1 Drawing Figure

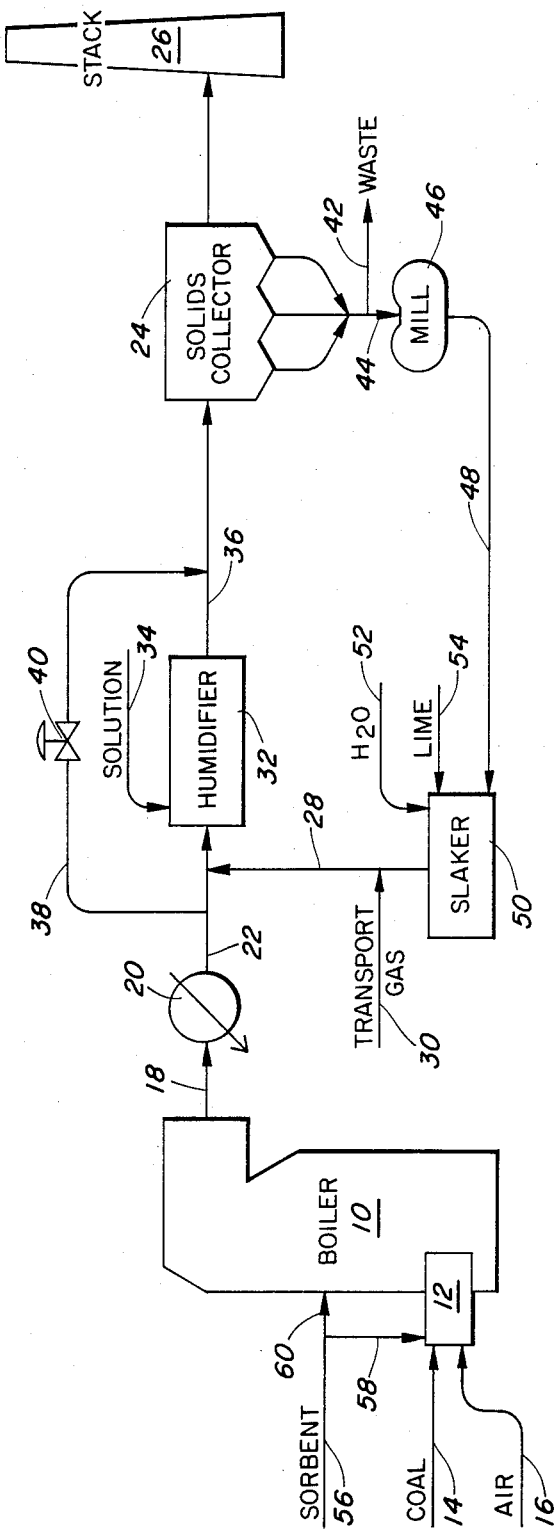

FLUE GAS DESULFURIZATION PROCESS

FIELD OF THE INVENTION

This invention is directed to an improved process for reducing the sulfur content of flue gas derived from combustion of a sulfur-containing fuel, in which process first a dry sorbent and subsequently an aqueous solution containing a solubilizing agent is sprayed into such flue gas. Ash and sorbent are subsequently separated from the flue gas. In one embodiment, a portion of the separated solids is regenerated and returned as sorbent, and in another embodiment the sorbent is initially injected into the boiler for activation by calcination.

BACKGROUND OF THE INVENTION

Efforts to reduce sulfur emissions in the gaseous products from combustion of a sulfur-containing fuel have been made in varying directions. Some processes attempt to reduce or eliminate the sulfur in the fuel prior to its combustion. Other processes propose the addition of compounds to the combustion zone which will in some manner change the nature of the sulfur compounds such that they may be more readily removed from the combustion products. And yet other processes remove sulfur compounds from the gaseous combustion products by chemical reaction.

U.S. Pat. No. 4,185,080, issued Jan. 22, 1980 to Rechmeier discloses a combustion gas desulfurization process wherein a powdered sorbent such as limestone or dolomite is added to a combustion zone, and a portion of the solids collected from the flue gas is reactivated and can be returned for injection into or downstream of the combustion zone.

The approach of chemical treatment to effect flue gas desulfurization can be further subdivided into wet scrubbing wherein a solution or suspension of reagent both enters and leaves the flue gas contacting zone in liquid state, spray drying wherein a solution or suspension of reagent enters the flue gas contacting zone in liquid state but is dried to produce a powdered solid leaving the contacting zone, and dry treatment wherein the treating reagent is a solid state powder both entering and leaving the contacting zone.

Illustrative of the wet scrubber approach is U.S. Pat. No. 3,928,537, issued Dec. 23, 1975 to Saitoh et al, which discloses contacting the exhaust gas with an aqueous solution of an organic acid to form a soluble sulfite or sulfate. The sulfite or sulfate is removed, and the organic acid regenerated, by a second step comprising reaction with a calcium compound such as an inorganic or an organic acid salt, for example calcium hydroxide or calcium formate.

The spray dryer approach is illustrated for example by U.S. Pat. No. 4,279,873, issued July 21, 1981 to Felsvang et al, which discloses spraying a suspension of fresh slaked lime and recycled fly ash plus spent calcium compound into the hot flue gas in such a manner as to evaporate the slurry droplets to dryness; the resulting powdered solids are removed from the flue gas by a downstream electrostatic precipitator or bag filter.

U.S. Pat. No. 4,178,349, issued Dec. 11, 1979 to Wienert illustrates the dry treatment; it discloses mixing a dry, powdered lime-bearing material in a reactor, and subsequently separating the solids from the treated flue gas. Another patent, U.S. Pat. No. 4,442,079, issued Apr. 10, 1984, to Donelly et al, outlines a flue gas desulfurization process which is primarily adapted to the spray dryer procedure just discussed, but is also stated to be applicable to injection of dry sorbent at a point of relatively low flue gas temperature, with water being sprayed into the gas either upstream or downstream of the sorbent injection point.

Current thinking seems to be that no one of the above-discussed strategies is the unique answer to the sulfur emission problem, either for new installations or for retrofit on an existing installation. Rather, numerous site-specific factors such as proximity to reagent source, space availability, and extent of sulfur removal required, must enter into the selection at each plant.

SUMMARY OF THE INVENTION

It is an objective of the present invention to provide a novel and advantageous method of removing sulfur compounds, especially sulfur dioxide, from combustion exhaust gas.

According to the present invention, flue gas is desulfurized by first contacting it at a relatively low temperature with a finely divided dry sorbent, and then humidifying the resulting gaseous suspension of solids by spraying therein a solubilizing solution. Solids subsequently removed from the gas can be reactivated for recycle. In another embodiment, make-up sorbent is initially activated by injecting it into the combustion zone.

BRIEF DESCRIPTION OF THE DRAWING

In the drawing, the sole FIGURE represents a flow diagram, partially schematic, of a flue gas desulfurization process according to our invention.

DETAILED DESCRIPTION OF THE INVENTION

Flue gas containing sulfur dioxide from combustion of a sulfur-containing fuel is typically passed from the combustion chamber through heat recovery exchangers and thence by way of duct work to a stack for disposal. Where the fuel is a solid, such as coal, or a heavy liquid, the combustion product gases will also contain ash solids such as fly ash, in which instance the flue gas will first be treated for solids removal by such as a bag filter or electrostatic precipitator (ESP) prior to being passed to the stack.

The invention will now be described by referring to the drawing. A combustor such as boiler 10 is provided with a burner 12 which is adapted to introduce a pulverized solid fuel such as coal from conduit 14 and a combustion-supporting gas such as air from cnduit 16. Hot combustion products leave the upper region of boiler 10, travelling past and through various heat exchange surfaces which typically extract heat by radiant and convective transfer, until they are discharged from the boiler assembly at duct 18. The final stage of heat recovery from the flue gas is often an air preheater, shown here as 20, which serves to preheat combustion air to conduit 16. Past practice has been that flue gas leaving air preheater 20 by way of duct 22 is passed directly to solids removal to separate out fly ash, such as by a bag filter or electrostatic precipitator 24, and thence discharged by a stack 26.

According to our invention, the hot flue gas in duct 22 is treated for capture of its sulfur dioxide and sulfur trioxide content by injection of a finely divided dry sorbent powder such as calcium hydroxide, magnesium hydroxide, or mixtures of these two, by way of a conduit 28. The dry powder can be carried through conduit 28 by use of a transport gas such as air or superheated steam from conduit 30. A short distance downstream from conduit 28, duct 22 enters humidifier 32, wherein solubilizing solution from conduit 34 is sprayed into the flue gas. Humidified flue gas passes by way of duct 36 to solids collector 24 and thence to stack 26. A portion of the flue gas in duct 22 can by-pass both the sorbent powder addition of conduit 28 and humidifier 32 by way of by-pass duct 38 and its associated damper 40, as will be more fully discussed.

Solids removed in collector 24 will normally comprise a mixture of fly ash, spent sorbent, and a proportion of unreacted sorbent. According to one embodiment of our invention, one portion of these collected solids is discarded to waste by way of conduit 42, and another portion in conduit 44 is treated to regenerate and recycle its unreacted sorbent content. This portion can be subjected to grinding as by mill 46, although such is usually not required, and can then be passed by way of conduit 48 to slaker 50, if necessary, or can by-pass slaker 50 directly to conduit 28 by a by-pass conduit not shown. The unreacted sorbent portion of the solids in conduit 48 is usually in the form of calcium and/or magnesium hydroxide. However, in one embodiment this portion can contain the oxide, and this material is reacted in slaker 50 with sufficient excess over the stoichiometric amount of water or preferably steam from conduit 52 to produce a dry slaked hydroxide product. As described earlier, this portion of solids containing dry slaked sorbent becomes the material injected by way of conduit 28 into duct 22.

Sorbent values, both spent and unspent, are continuously discarded from the system by way of conduit 42. Make-up sorbent can be added to the system according to two different embodiments of our invention. In one embodiment, make-up is added in the form of the oxide, e.g. quicklime, to slaker 50 by way of conduit 54. In the other embodiment, the sorbent is added in its less expensive but less reactive carbonate form, as limestone or dolomite, at conduit 56. This material can either be added to boiler 10 by way of conduit 58 into burner 12, or by way of conduit 60 through separate injection ports into an upper region of the combustion zone, depending upon the prevailing temperature profile and residence time. In either event, the limestone or dolomite is calcined by the elevated temperature. The resulting suspension of calcium and/or magnesium oxide is thus afforded additional reaction time for flue gas desulfurization in duct 18 and air preheater 20.

The various operating parameters which affect the efficacy of our invention will next be examined.

The process of the present invention is especially adapted to remove sulfur dioxide from a flue gas wherein availability of relatively short residence time in the conduct work upstream of the ESP (as in a retrofit installation) and/or a relatively high concentration of sulfur dioxide combine to present difficult removal. The humidification of the flue gas and its entrained sorbent powder by spraying water containing solubilizing agent is an essential aspect of our invention. As solubilizing agent we presently prefer sodium hydroxide, although other useful materials include sodium carbonate, calcium chloride, adipic acid, and glycerol. Although we do not wish to be so bound, we theorize that compounds which form highly ionized solutions or which are deliquescent serve to form a thin liquid film of greatly increased reactivity toward sulfur dioxide on the surface of each of the particles of gas-suspended solid sorbent.

It is necessary for several reasons to control the humidity, or approach to dew point, of the flue gas containing sorbent and sprayed solution. It is preferable to approach the dew point at the inlet to the solids collector as close as possible without causing operating problems, since we postulate that a more humid flue gas permits existence of a liquid film on the sorbent, and the reaction of gaseous sulfur dioxide with liquid solution is much more rapid than with a solid particle. On the other hand, if the dew point is approached too closely, the spray droplets tend to foul and plug the surfaces of bag filters or ESP collector plates, and to cause excessive corrosion of duct work. We prefer to approach at least to within about 35° C. of, but no nearer than about 10° C. of, the saturation temperature. According to one embodiment of our invention, the degree of approach to saturation is controlled by proportioning the amount of flue gas admitted through duct 38 by damper 40.

The degree of desulfurization achieved is also controlled by the Ca/S ratio, i.e. the amount of calcium (and/or magnesium) compound in the sorbent as compared to the amount of sulfur dioxide in the flue gas being treated. This ratio is normally expressed in moles, and we prefer that it be in the range from about 0.5:1 to about 3:1. It is controlled by the flow rates in conduits 28, 54 and/or 56. Solubility of the solubilizing salt, e.g. calcium chloride, sodium hydroxide, etc. in water determines the maximum concentration of spray solution. It is advantageous that the duct work provides a residence time for the humidified solids of at least about 1 second, and preferably more.

In the usual application of this invention, the sulfur-containing fuel being burned will also contain a significant proportion of ash-forming constituents, and thus the flue gas will contain fly ash. Addition of solubilizing (humidifying) solution and dry sorbent according to the present invention causes an increase in the solids loading of the flue gas, and thus on the duty to be served by the downstream solids collector bag house or ESP. However, it has been determined that the solids retained on the surfaces of such solids collector remain active for $SO_2$ absorption for a longer period when humidifed with a solubilizing agent according to the present invention, particularly when the desired close dew point approach is maintained. Additionally, the collected solids contain some non-reacted calcium values, in addition to the fly ash and sulfite and sulfate compounds, which values can be reclaimed, as noted, by recycle.

The temperature of the flue gas at the point of injection of the dry sorbent via conduit 28 should be between about 120° and about 230°, and preferably between about 140° and about 175° C.

The invention will now be illustrated by the following examples.

EXAMPLE I

A flue gas from an electrical utility station burning 2.4 weight percent sulfur coal is analyzed at a point in conduit 22 just downstream of the air preheater. The flue gas analysis is as follows: temperature 150° C., water content 5 volume percent, sulfur dioxide 1750 ppm (by volume, dry basis), oxygen 4.5%, and solids content 2.5 grains/scf (dry). Into this flue gas is injected by way of conduit 28 an air suspension of finely divided slaked lime in amount sufficient to provide a resultant Ca:S molar ratio of about 2. Next, a solution of sodium hydroxide in water is sprayed into the gas stream by way of conduit 34 in amount sufficient to result in a gas temperature about 10° C. above the dew point at the ESP inlet and a weight ratio of NaOH to Ca(OH)$_2$ of about 0.1. The flue gas velocity in the existing duct is such that the sorbent particles have a residence time of about 2 seconds prior to passage into the ESP. Average residence time of collected solids in the ESP is about 22 minutes. The SO$_2$ content of the gas exit the ESP is reduced to 440 ppmv, dry basis.

EXAMPLE II

The test of Example I is repeated, except that about half the active calcium entering humidifier 32 is recycle by way of conduit 44, and the balance is derived from limestone admitted by way of conduit 60. The SO$_2$ content of the gas exit the ESP is again about 440 ppmv, dry basis.

EXAMPLE III

As a basis for comparison, Example I is repeated except that no solubilizing agent is added in the water through conduit 34. The sulfur dioxide analysis exit the ESP increases to 850 ppmv, dry.

EXAMPLES IV-VI

Solutions of calcium chloride, sodium carbonate, and glycerol are sequentially substituted for the sodium hydroxide solution in Example I, with similar sulfur dioxide removal results.

EXAMPLE VII

Example I is repeated, except that the quantity of sodium hydroxide solution is decreased to the point that the dew point approach is only about 25° C. Analysis of SO$_2$ exit the ESP increases to about 960 ppmv, dry.

EXAMPLE VIII

Example I is repeated, except that the slaked lime rate in conduit 28 is decreased to provide a Ca:S molar ratio of about 1. The SO$_2$ analysis exit the ESP increases to about 950 ppmv, dry.

Reasonable variation and modification are possible within the scope of the foregoing disclosure and the appended claims to our invention, the essence of which is that we have provided an improved method for reducing the sulfur dioxide content of flue gas by reaction with sorbent of increased activity, and for preparing such sorbent.

What is claimed is:

1. The method for reducing sulfur dioxide content of a flue gas resulting from combustion of a sulfur-containing fuel, which method comprises:
    (a) mixing into said flue gas, at a point where its temperature is between about 120° and about 230° C., a finely divided dry sorbent comprising alkaline earth metal oxide or hydroxide in amount sufficient to provide a metal salt: sulfur ratio of at least about 0.5, said alkaline earth metal being selected from calcium and magnesium;
    (b) spraying into the resulting suspension of sorbent in flue gas an aqueous solution of solubilizing agent, such agent being selected from sodium hydroxide, sodium carbonate, calcium chloride, adipic acid and glycerol;
    (c) providing a contact time between said sorbent in flue gas and droplets resulting from said spraying of at least about 1 second;
    (d) subsequently separating from said flue gas solids comprising sorbent and solids resulting from combustion of said fuel;
    (e) discharging from said separating a flue gas of substantially diminished sulfur dioxide content; and
    (f) regulating the rate of said spraying relative to the rate of said flue gas such that the temperature of said flue gas at the point of said separating is between about 10° C. and about 35° C. above its saturation temperature.

2. The method of claim 1 wherein additional sorbent selected from calcium and magnesium carbonate is introduced in dry finely divided form into a zone adjacent said combustion.

3. The method of claim 2 wherein a portion of the solids derived from the separating of step (d) is admixed with water in at least about stoichiometric amount to hydrate its alkaline earth oxide content, and the resulting hydrate in dry state is returned as sorbent to step (a).

4. The method of claim 1 wherein said solubilizing agent comprises sodium hydroxide in the amount of about 5 to about 10 weight percent of said sorbent.

* * * * *